Aug. 22, 1961 | V. O. MET | 2,997,654

BINARY COUNTER

Filed Aug. 14, 1959 | 2 Sheets-Sheet 1

INVENTOR.
VICTOR O. MET.
BY
Lewis P. Elbinger
ATTORNEY.

Aug. 22, 1961 V. O. MET 2,997,654

BINARY COUNTER

Filed Aug. 14, 1959 2 Sheets-Sheet 2

INVENTOR.
VICTOR O. MET.

BY [signature]

ATTORNEY.

United States Patent Office 2,997,654

Patented Aug. 22, 1961

2,997,654
BINARY COUNTER

Victor O. Met, Palo Alto, Calif., assignor to General Electric Company, a corporation of New York

Filed Aug. 14, 1959, Ser. No. 833,723
14 Claims. (Cl. 328—21)

This invention relates to binary counters and more particularly to counters employing a plurality of bistable oscillators.

It has been found by experience that electronic data processing systems are most reliable when the electronic portions thereof need handle only data which is basically of binary digital form. In binary digital data processing systems, each element of information is represented by either a 1 or 0. In the binary digital data processing systems of the prior art, it has been customary to represent these binary digits by the presence and absence of electrical signals at specified locations in the system at predetermined times; for example, an electronic gate may be "opened" at a particular time by a system "clock" signal if there is an input data signal applied to the gate at that moment, the numeral 1 is said to be present, whereas if there is no input signal applied to the gate, the numeral 0 is said to be present. The simulation of binary digital data by the presence and absence of electrical pulses may be termed "the pulse-no pulse" representation.

In order to process data at increased speeds, microwave frequency signals are employed to represent data. For most reliable processing of data at microwave frequencies, traveling-wave tubes are employed as active circuit elements, since amplifiers employing traveling-wave tubes are well known for their ability to amplify microwave signals over a broad range or frequencies. It has been found that many advantages are realized in such a data processing system by avoiding the pulse-no pulse representation of binary digital data, and by employing, instead, a frequency representation of data. In a binary digital data processing system employing frequency representation of data, a signal having a first specified frequency represents the numeral 1, and a signal having a second specified frequency represents the numeral 0. Thus, in such a system data is completely represented by signals having either one of two allowable frequencies.

A device frequently used in a data processing system is the counter. A counter is a circuit capable of changing from one to the next of a sequence of distinguishable states upon each receipt of an input signal. In a binary counter, each element thereof is bistable; that is, capable of operating in either one of two stable states. One stable state represents the binary digit 1 and the other stable state represents the binary digit 0. Each bistable element is transferred from the state in which it is operating to its other stable state upon receipt of an input trigger signal, usually a binary 1. A bistable element, therefore, returns to the state in which it was operating after the receipt of two successive trigger signals. Each bistable element of a counter is coupled to a succeeding bistable element and supplies the trigger signal therefor. Thus, for each pair of trigger signals received, a bistable element delivers a single trigger signal to the succeeding bistable element.

The bistable element of a counter in a data processing system employing frequency representation of data must be adapted to deliver an output signal having one of the two allowable frequencies when the bistable element is operating in one state and having the other allowable frequency when operating in the other state. Upon receipt of a trigger signal, the output signal of each such bistable element has its frequency changed from one of the allowable values to the other. One type of bistable element representing data by frequency is described in an article by V. Met, "On Multimode Oscillators with Constant Time Delay," proc. IRE, vol. 45, pp. 1119–1128; August 1957. A bistable element, such as is described in the above-identified article, employs an oscillator adapted to oscillate at either one of two allowable frequencies, and the bistable element is adapted to transfer from the state from which it is operating to its other stable state upon receipt of an input trigger signal having a frequency that is equal in value to the sum of the two allowable frequencies of the oscillator.

Such bistable elements are, in themselves, merely components useful in a counter. Means must be provided for interconnecting these bistable elements to form a complete counter.

It is therefore the object of this invention to provide a novel counter.

It is a further object of this invention to provide a counter employing frequency representation of data.

It is a further object of this invention to provide a binary digital counter employing frequency representation of data.

It is a further object of this invention to provide a circuit for interconnecting a plurality of bistable oscillators to form a counter.

The foregoing objects are achieved by providing a delay line coupled to receive only the output signal that the bistable element delivers when operating in one of its stable states. The delay line is adjusted to provide a delay substantially equal to the trigger signal duration desired for transferring the bistable element from one state to the other. The output signal of the delay line is combined in a modulator with the signal delivered by the bistable element when operating in its other stable state. A filter coupled to receive the modulator output signal product of the modulator. Therefore, an output signal from the filter will appear immediately after the bistable element is transferred to said other stable state and will continue only for said desired duration. The output signal of this filter is applied to the next succeeding bistable element of the counter and functions as a trigger signal therefor.

The invention will be described with reference to the accompanying drawings wherein.

Figure 1:
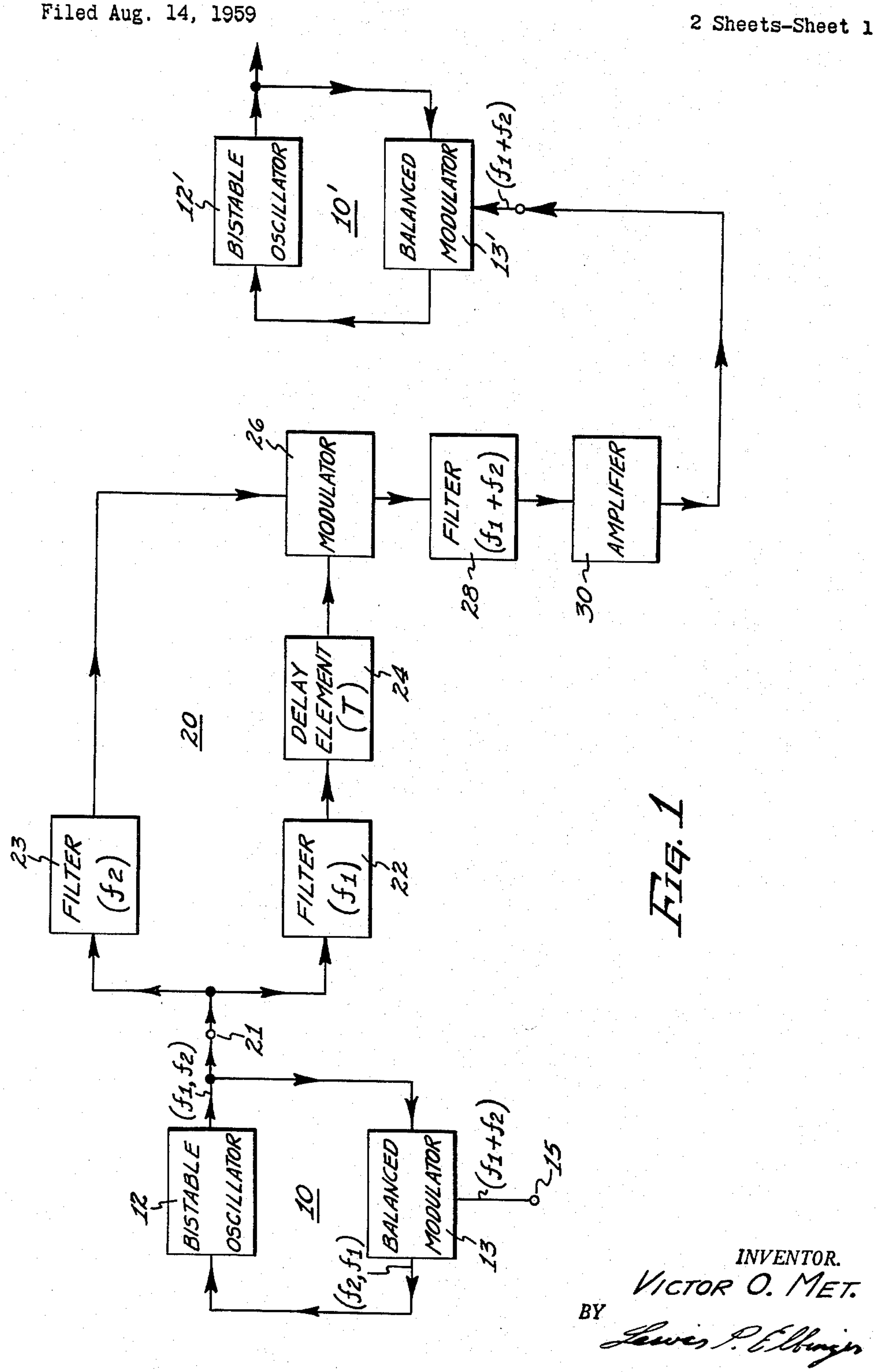
FIGURE 1 is a block diagram of the binary counter of this invention.

The counter of FIG. 1 comprises a plurality of bistable elements, each element being adapted to deliver an output signal having either one of two allowable frequencies, and a plurality of coupling circuits for connecting each bistable element of the counter to the next succeeding bistable element thereof. The number of bistable elements employed in a counter is determined by the number of distinguishable states that the counter must assume. For simplicity of illustration and description, the counter of FIG. 1 is shown to have but two bistable elements 10 and 10'. Each bistable element of the counter is identical to the other bistable elements thereof. Bistable element 10 comprises a bistable oscillator 12 connected in circuit with a balanced modulator 13. Bistable oscillator 12 may be any oscillator of proper characteristic, adapted to oscillate in either one of two desired frequencies, and further adapted to transfer from the frequency in which it is operating to the other one of said two frequencies upon receipt of an input signal having said other frequency. A suitable bistable oscillator for this purpose is described in the aforementioned V. Met article, and comprises a traveling-wave tube adapted to oscillate in two stable modes, for example with frequencies of 2790 and 2985 mc.

When the above described traveling-wave tube oscillator is operating, for example, at 2790 mc., and receives a 2985 mc. input signal, of suitable duration and amplitude, it transfers to operation at 2985 mc. Conversely, the oscillator transfers from 2985 mc. to 2790 mc. upon receipt of a 2790 mc. input signal.

The output signal of bistable element 12 is coupled to one input terminal of balanced modulator 13. The other input terminal of balanced modulator 13 is adapted to receive the trigger signal which is applied at a terminal 15. This trigger signal has a frequency equal to the sum of the two allowable frequencies of oscillator 12, in the cited example, 5775 mc. A balanced modulator is a circuit which receives two input signals, modulates one input signal with the other, and delivers the modulation products free from the presence of either input signal. For example, balanced modulator 13 delivers an output signal saving a frequency component equal to the difference of the two frequencies received thereby, but having no component with a frequency equal to that of either of the two received signals. Balanced modulators suitable for the purpose are the subject of copending U.S. patent application S.N. 687,497, by W. A. Edson, filed October 1, 1957, and S.N. 832,629, by M. P. Forrer and V. O. Met, filed August 10, 1959, both of said applications being assigned to the assignee of the instant invention.

Assume now that bistable oscillator 12 is oscillating at frequency $f_1$, which is arbitrarily selected to represent the binary digit 0. So long as no trigger signal is received at terminal 15 oscillator 12 will continue to oscillate at frequency $f_1$, and balanced modulator 13 produces no output signal. Assume now that a trigger signal having a frequency $f_1+f_2$ is applied at terminal 15. During the application of this trigger signal, one of the modulation products delivered by modulator 13 will be the frequency difference signal, which has a frequency $f_2$. The frequency $f_2$ represents the other allowable frequency of oscillation of bistable oscillator 12, and is arbitrarily designated to represent the binary 1. This signal of frequency $f_2$ provided by modulator 13 is applied as an input signal to oscillator 12, and if of sufficient duration, will serve to transfer the state of operation of oscillator 12 from frequency $f_1$ to frequency $f_2$. Thus, bistable element 10, which has been delivering an output signal of frequency $f_1$, representing 0, is transferred to deliver an output signal of frequency $f_2$, representing 1, upon application of the trigger signal thereto.

Conversely, when oscillator 12 is operating at frequency $f_2$, and a trigger signal is received at terminal 15, balanced modulator 13 will deliver an output signal of frequency $f_1$, which will, in turn, transfer bistable oscillator 12 to its 0-state, wherein it delivers an output signal having a frequency $f_1$.

Figure 2:
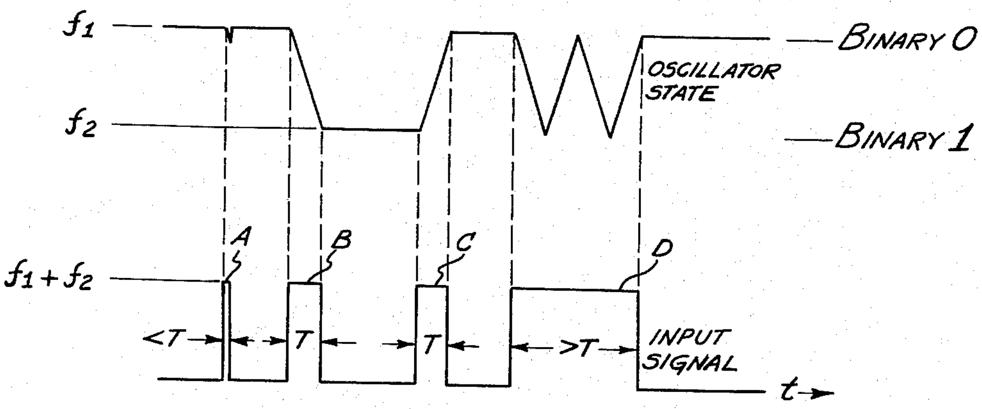
FIGURES 2 and 3 are charts for explaining the operation of the counter of FIG. 1.

Thus, bistable element 10 has been described as providing an output signal having either one of two allowable frequencies, and being adapted to transfer from one state to the other upon receipt of a trigger signal of proper duration. The duration of this input signal will now be shown to be confined to certain limits in order to properly transfer the state of bistable oscillator 12. The upper graph of FIG. 2 illustrates the instantaneous frequency of operation of bistable oscillator 12 in response to trigger signals of various durations, as shown by the lower graph of FIG. 2. It is to be understood that this analysis of the value of instantaneous frequency of the bistable oscillator is in accordance with the theory of operation of the bistable element, as presently understood, and is not to be considered a limitation on the operation of this invention.

It is seen, in FIG. 2, that upon the application of a trigger signal having a frequency $f_1+f_2$ bistable oscillator 12, which is operating at one of frequencies $f_1$ or $f_2$, immediately has applied to its input terminal the other of these two frequencies, and, therefore, commences to change to its other stable state in accordance with the input frequency. If the duration of the input signal is too short oscillator 12 does not enter its other stable state, but remains in the state in which it was operating. Thus, the short trigger pulse, identified as pulse A, is of a duration too short to effect the transfer of bistable oscillator 12 from one state to another. On the other hand, when a trigger pulse is of adequate duration, designated as having a duration T, oscillator 12 will transfer from the frequency in which it is operating to the other allowable frequency. Thus, for trigger pulse B oscillator 12 transfers from $f_1$ to $f_2$ and, similarly, if the oscillator is operating at frequency $f_2$ a trigger pulse C serves to transfer the oscillator back to $f_1$.

Consider now the operation of oscillator 12 for pulses of considerably longer duration than duration T, as shown, for example, by a pulse D. The oscillator is operating at frequency $f_1$ when trigger pulse D commences. An input signal of frequency $f_2$ is received by oscillator 12 from balanced modulator 13, and oscillator 12 transfers to its other state, $f_2$. As soon as oscillator 12 is operating at $f_2$, balanced modulator 13 produces a difference signal having a frequency $f_1$, which tends to reset the oscillator to frequency $f_1$. Thus, a cyclical action occurs, wherein, as soon as oscillator 12 reaches one state of operation an input signal is applied thereto which tends to change it to its other stable state. Therefore, during a long duration input signal, such as pulse D, of FIG. 2, bistable element 10 operates as a stable multivibrator wherein data is represented by signal frequency rather than signal amplitude. The final state of oscillator 12 will depend on its initial state and the duration of the trigger signal. To insure that oscillator 12 is transferred from the state in which it is operating to the other state, and will remain in said other state at the termination of the trigger pulse, the shortest trigger pulse should have a duration substantially equal to T; wherein T is the time for bistable element 10 to make one transfer from one stable state to the other.

It is the function of coupling circuit 20 to respond to a particular stable state of bistable element 10 to provide a trigger signal of proper duration for the next succeeding bistable element 10' of the counter of FIG. 1. A pair of filters 22 and 23 are coupled to receive the output signal of bistable oscillator 12 from a terminal 21. Filter 22 is a band-pass filter adapted to pass only signals having the frequency $f_1$. Filter 23 is a band-pass filter adapted to pass only signals having the frequency $f_2$. Band-pass filters, such as filters 22 and 23, are well-known in the art and are described, for example, in the publication by G. L. Ragan, "Microwave Transmission Circuits," section 10, McGraw-Hill Book Company, Inc., New York, 1948.

The output signal of filter 22 is applied to a delay element 24. Delay element 24 may be of any type well-known in the art; for example, if the signals being processed are in the microwave frequency region delay element 24 may be a length of waveguide, a length of coaxial transmission line, a length of stripline, etc. For lower frequencies delay element 24 may be a mercury delay line or a lumped parameter delay line.

Filter 23 and delay element 24 are connected to respective input terminals of a modulator 26. Modulator 26 may be a balanced modulator, such as balanced modulator 13 of bistable element 10. However, it is not necessary that modulator 26 be a balanced modulator, but instead it may be any device adapted to provide modulation of one input signal by another. Such modulators are described, for example, in the book by J. F. Reintjes and G. T. Coate, "Principles of Radar," third edition, McGraw-Hill Book Company, Inc., New York, pp. 871–886, 1952.

In accordance with the principles of this invention, the total time for passage of a signal between terminal 21 and an input terminal of modulator 26 over the transmission path through filter 22 and delay element 24 is greater by the desired time duration T than the time for passage of a signal over the path including filter 23. For simplicity, FIG. 1 illustrates that this total differential transmission delay is included in delay element 24, which, therefore, provides a total delay of duration T for signals passing therethrough. However, the elements of FIG. 1 are connected together by microwave transmission components, when microwave frequency signals are used. These microwave transmission components include, for example, waveguides, coaxial lines, strip-lines, etc., each interconnecting component having its own delay. Hence, a significant delay, $td_1$, may be encountered in transmitting a signal from terminal 21, through filter 23, to modulator 26. Therefore, the total delay which is introduced by delay element 24 is that which makes the transmission time from terminal 21, through filter 22 and delay element 24, to modulator 26 greater by the time T than $td_1$; i.e., $$\text{delay } (\mathbf{24}) = td_1 + T - td_2$$

where $td_2$ is the delay through this latter path, exclusive of the delay in element 24.

The output signal of modulator 26 is applied to a band-pass filter 28, which transmits only signals having the frequency $f_1+f_2$. The output signal of filter 28 is applied to an amplifier 30, which in turn couples its output signal, as an input trigger signal, to the bistable element 10'. Amplifier 30 adjusts the amplitude level of the signal of frequency $f_1+f_2$ so that it has sufficient magnitude to trigger bistable element 10'. Amplifier 30 may be, for example, a traveling-wave tube amplifier, and serves to compensate for the conversion losses of modulators 13 and 26. Amplifier 30 may be eliminated if these modulators have conversion gains.

Figure 3:
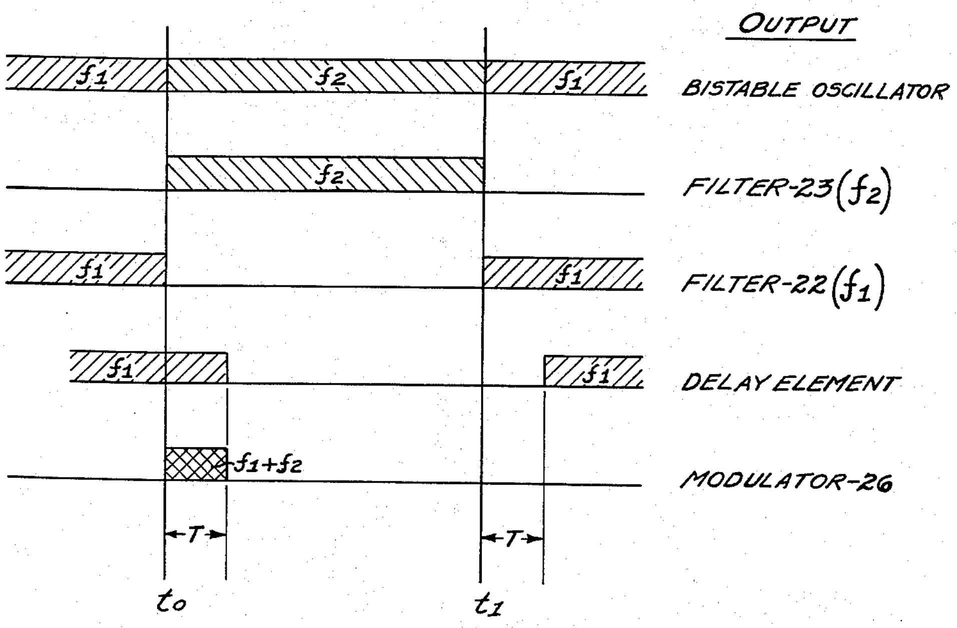

The operation of coupling circuit 20 is demonstrated by the chart of FIG. 3. Assume that bistable oscillator 12 is oscillating at frequency $f_1$, as shown to the left of time $t_0$. At $t_0$, a trigger signal is applied to terminal 15 of bistable element 10 and transfers bistable oscillator 12 to operation at frequency $f_2$, as shown by the middle portion of FIG. 3, between $t_0$ and $t_1$. At this time filter 23 commences transmitting the output signal of oscillator 12 to modulator 26. However, immediately prior to time $t_0$, filter 22 was transmitting the oscillation output signal at frequency $f_1$ through delay element 24 to modulator 26. Before time $t_0$, the only signal arriving at modulator 26 was that provided by delay element 24, so that no modulator 26 output signal at frequency $f_1+f_2$ was provided. After time $t_0$, although no signal is any longer passed through filter 22, a signal is, in effect, stored in delay element 24 and continues to issue therefrom for a duration T. This signal is applied to the other terminal of modulator 26. Thus, for the duration T immediately after $t_0$, two signals, one of frequency $f_1$ and the other of frequency $f_2$ are applied to the respective input terminals of modulator 26. Therefore, during this interval modulator 26 provides an output signal having a component of frequency $f_1+f_2$. This signal component passes through filter 28, is amplified by amplifier 30 and is applied to bistable element 10'. Since this signal is of proper duration and frequency, bistable element 10' is triggered from the frequency at which was operating to its other allowable frequency.

At time $t_1$, bistable element 10 has another trigger signal applied thereto and resumes operation at frequency $f_1$. However, at this time, no signal has been stored in delay element 24, and no signal reaches modulator 26 from delay element 24 for a time T immediately following $t_1$. At the time $t_1+T$, a signal of frequency $f_1$ issues from delay element 24. However, no other signal reaches modulator 26, so that no signal of frequency $f_1+f_2$ issues therefrom. Consequently, the only time that a trigger signal is provided by coupling circuit 20 is in the interval T immediately following the moment when bistable element 10 enters the state wherein it is operating at frequency $f_2$, which represents a binary 1. In other words, a trigger signal is applied to bistable element 10' for every two trigger signals applied to bistable element 10, and a counter is therefore provided.

There has, therefore, been described a counter for counting input signals in a bistable manner, wherein said counting is accomplished by maintaining data only in frequency representation. Bistable elements are provided in the counter, which are adapted to operate at either one of two allowable frequencies, representing respective binary digits, and are adapted to change their state of operation in response to a trigger signal, of proper duration, having a frequency equal to the sum of the two allowable frequencies of operation. The coupling circuits interconnecting these bistable elements store signals having one of the two allowable frequencies, so that when the preceding bistable element transfers to operation at the other of these two allowable frequencies, this stored signal may be mixed with the new frequency signal to provide a signal output of proper duration for triggering the succeeding bistable element.

While FIG. 1 discloses the preferred embodiment, this invention is not to be construed as limited thereto. For example, the invention is operable at radio or lower frequencies, in accordance with the spirit of this invention, and its embodiment therefore, may employ conventional circuit components, such as transistor amplifiers, lumped parameter filters and delay elements, etc. Furthermore, it is not necessary that the trigger signal frequency be the sum of the two allowable frequencies of the bistable oscillator, but instead may be the difference between these two frequencies, i.e., $f_2-f_1$. In this instance, the output of balanced modulator 13 when a trigger signal is applied thereto, will continue to be a signal having the other allowable frequency than that at which bistable oscillator 12 is operating, and, therefore, the bistable element will be properly triggered. In addition, it may be desirable to eliminate filter 23 in some instances and to couple terminal 21 directly to modulator 26, as well as to provide the parallel path through filter 22 and delay element 24. It is, of course, apparent that filters 22 and 23 may be interchanged in coupling circuit 20, in which case a trigger signal will be applied to delay element 10' immediately after oscillator 12 commences operating at frequency $f_1$.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In combination, a first filter adapted to receive an input signal and to selectively transmit a signal having a first frequency, a second filter adapted to receive said input signal and to selectively transmit a signal having a second frequency, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, and means for applying the output signals of said delay element and said first filter to said combining means.

2. In combination, a first filter adapted to receive an input signal and to selectively transmit a signal having a first frequency, a second filter adapted to receive said input signal and to selectively transmit a signal having a second frequency, a delay element, said second filter being connected to deliver its output signal to said delay element, combining means for receiving two signals and for delivering an output signal having a frequency that is the sum of the frequencies of the two signals received thereby, and means for applying the output signals of said delay element and said first filter to said combining means.

3. A coupling circuit for a binary counter, the bistable element of said binary counter being adapted to provide an output signal having either one of first and second allowable frequencies, comprising: first and second filters, each being adapted to receive said output signal and to selectively transmit a signal having a respective one of said first and second frequencies, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, and means for applying the output signals of said delay element and said first filter to said combining means.

4. A coupling circuit for a binary counter, the bistable element of said binary counter being adapted to provide an output signal having either one of first and second allowable frequencies, comprising: first and second filters, each being adapted to receive said output signal and to selectively transmit a signal having a respective one of said first and second frequencies, a delay element, said second filter being connected to deliver its output signal to said delay element, combining means for receiving two signals and for delivering an output signal having a frequency that is the sum of the frequencies of the two signals received thereby, and means for applying the output signals of said delay element and said first filter to said combining means.

5. A coupling circuit for a binary counter, the bistable element of said binary counter being adapted to provide an output signal having either one of first and second allowable frequencies, comprising: first and second filters, each being adapted to receive said output signal and to selectively transmit a signal having a respective one of said first and second frequencies, a delay element, said second filter being connected to deliver its output signal to said delay element, modulating means for receiving two signals and for modulating one of the signals received thereby with the other of the signals received thereby, means for applying the output signals of said delay element and said first filter to said modulating means, and a third filter connected to receive the output signal of said modulating means and adapted to selectively transmit a signal having a frequency that is one of (*a*) the sum of said first and second frequencies and (*b*) the difference between said first and second frequencies received by said modulating means.

6. A coupling circuit for a binary counter, the bistable element of said binary counter being adapted to provide an output signal having either one of first and second allowable frequencies, comprising: first and second filters, each being adapted to receive said output signal and to selectively transmit a signal having a respective one of said first and second frequencies, a delay element, said second filter being connected to deliver its output signal to said delay element, modulating means for receiving two signals and for modulating one of the signals received thereby with the other of the signals received thereby, means for applying the output signals of said delay element and said first filter to said modulating means, and a third filter connected to receive the output signal of said modulating means and adapted to selectively transmit a signal having a frequency that is the sum of said first and second frequencies.

7. A binary counter comprising: a bistable element adapted to provide an output signal having either one of first and second frequencies, first and second filters adapted to receive said output signal and to selectively transmit a signal having a respective one of said first and second frequencies, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, and means for applying the output signals of said delay element and said first filter to said combining means.

8. A binary counter comprising: a first filter adapted to receive an input signal and to selectively transmit a signal having a first frequency, a second filter adapted to receive said input signal and to selectively transmit a signal having a second frequency, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, means for applying the output signals of said delay element and said first filter to said combining means, a bistable element adapted to provide an output signal having either one of said first and second frequencies, said bistable element being further adapted to alter the frequency of the output signal provided thereby from one of said first and second frequencies to the other of said first and second frequencies in response to an input signal having a frequency that is one of (*a*) the sum of said first and second frequencies and (*b*) the difference between said first and second frequencies, and means for applying the output signal of said combining means to said bistable element.

9. A binary counter comprising: a first bistable element adapted to provide an output signal having either one of first and second frequencies, first and second filters adapted to receive said output signal and to selectively transmit a signal having a respective one of said first and second frequencies, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, means for applying the output signals of said delay element and said first filter to said combining means, a second bistable element adapted to provide an output signal having either one of said first and second frequencies, said second bistable element being further adapted to alter the frequency of the output signal provided thereby from one of said first and second frequencies to the other of said first and second frequencies in response to an input signal having a frequency that is one of (*a*) the sum of said first and second frequencies and (*b*) the difference between said first and second frequencies, and means for applying the output signal of said combining means to said second bistable element.

10. A binary counter comprising: a plurality of bistable elements, each of said bistable elements being adapted to provide an output signal having either one of first and second frequencies, each of said bistable elements being further adapted to alter the frequency of the output signal provided thereby from one of said frequencies to the other of said frequencies in response to a trigger signal having a frequency that is one of (*a*) the sum of said first and second frequencies and (*b*) the difference between said first and second frequencies; a plurality of coupling circuits, each of said coupling circuits being adapted to receive the output signal of a respective one of said bistable elements and to deliver a trigger signal to a different respective one of said bistable elements, each of said coupling circuits comprising first and second filters adapted to receive the output signal delivered by the corresponding bistable element and to selectively transmit a signal having a respective one of said first and second frequencies, a delay element, said second filter being connected to deliver its output signal to said delay element, combining means for receiving the two signals and for delivering an output signal having a frequency that is one of (*a*) the sum of said first and second frequencies and (*b*) the difference between said first and second frequencies, and means for applying the output signals of said delay element and said first filter to said combining means, wherein said combining means output signal is said trigger signal.

11. A binary counter comprising: a first filter adapted to receive an input signal and to selectively transmit a signal having a first frequency, a second filter adapted to receive said input signal and to selectively transmit a signal having a second frequency, a delay element, said second filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, means for applying the output signals of said delay element and said first filter to said combining means, a bistable element adapted to provide an output signal having either one of said first and second frequencies, said bistable element being further adapted to alter the frequency of the output signal provided thereby from the one of said first and second frequencies to the other of said first and second frequencies in response to an input signal of predetermined duration having a frequency that is one of (*a*) the sum of said first and second frequencies and (*b*) the difference between said first and second frequencies, and means for applying the output signal of said combining means to said bistable element; wherein said delay element is adapted to delay the signals passing therethrough for a duration substantially equal to said predetermined duration.

12. The combination of claim 1, wherein said combining means comprises: a modulator adapted to receive two signals and to provide a modulation product output signal, and a third filter adapted to receive said modulation product output signal and to selectively transmit a signal having a frequency that is one of (*a*) the sum of said first and second frequencies and (*b*) the difference between said first and second frequencies.

13. In combination, a filter adapted to receive an input signal and to selectively transmit a signal having a predetermined frequency, a delay element, said filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, and means for applying the output signal of said delay element and said input signal to said combining means.

14. A binary counter comprising: a bistable element adapted to provide an output signal having either one of first and second frequencies, a filter adapted to receive said output signal and to selectively transmit a signal having one of said frequencies, a delay element, said filter being connected to deliver its output signal to said delay element, combining means for receiving two signals and for delivering an output signal having a frequency that is one of (*a*) the sum of the frequencies of the two signals received thereby and (*b*) the difference between the frequencies of the two signals received thereby, and means for applying the output signals of said delay element and said bistable element to said combining means.

References Cited in the file of this patent

UNITED STATES PATENTS 2,833,857 Robin ------------------ May 6, 1958

UNITED STATES PATENT OFFICE

CERTIFICATE OF CORRECTION

Patent No. 2,997,654 August 22, 1961

Victor O. Met

It is hereby certified that error appears in the above numbered patent requiring correction and that the said Letters Patent should read as corrected below.

Column 3, line 17, for "saving" read -- having --; column 4, lines 27 and 28, for "as a stable" read -- as an astable --.

Signed and sealed this 6th day of February 1962.

(SEAL)
Attest:

ERNEST W. SWIDER
Attesting Officer

DAVID L. LADD
Commissioner of Patents